(12) United States Patent
Schmutz et al.

(10) Patent No.: US 10,971,126 B1
(45) Date of Patent: Apr. 6, 2021

(54) VIBRATION DAMPER

(71) Applicant: Wilson Audio Specialties, Inc., Provo, UT (US)

(72) Inventors: Robert Blake Schmutz, Springville, UT (US); Daryl C. Wilson, Springville, UT (US)

(73) Assignee: Wilson Audio Specialties, Inc., Provo, UT (US)

( * ) Notice: Subject to any disclaimer, the term of this patent is extended or adjusted under 35 U.S.C. 154(b) by 0 days.

(21) Appl. No.: 17/065,000

(22) Filed: Oct. 7, 2020

Related U.S. Application Data

(60) Provisional application No. 62/958,553, filed on Jan. 8, 2020.

(51) Int. Cl.
*G10K 11/162* (2006.01)
(52) U.S. Cl.
CPC .................... *G10K 11/162* (2013.01)
(58) Field of Classification Search
CPC .............................. G10K 11/162; G10K 11/16
USPC .................................................... 181/207, 175
See application file for complete search history.

(56) References Cited

U.S. PATENT DOCUMENTS

| | | | | | |
|---|---|---|---|---|---|
| 4,880,077 A | * | 11/1989 | Verse | ...................... | F16F 13/20 181/207 |
| 5,771,990 A | * | 6/1998 | Liang | ........................ | F16F 7/00 181/208 |
| 5,942,735 A | * | 8/1999 | Liang | .................... | F16F 3/0876 181/207 |
| 6,155,530 A | * | 12/2000 | Borgen | .................. | H04R 1/026 248/638 |
| 6,357,717 B1 | * | 3/2002 | Kennard, IV | ............. | F16F 1/44 248/562 |
| 8,899,376 B2 | * | 12/2014 | Akimoto | ................. | F16F 1/125 181/209 |
| 9,366,311 B2 | * | 6/2016 | Gustavsson | ........... | F16F 1/3713 |
| 9,920,811 B1 | * | 3/2018 | Morrison | ................ | F16F 15/08 |
| 10,187,712 B2 | * | 1/2019 | Latvis, Jr. | ................. | F16F 7/00 |
| 2001/0037911 A1 | * | 11/2001 | Stanienda | ............. | F16B 5/0241 181/207 |

* cited by examiner

*Primary Examiner* — Forrest M Phillips
(74) *Attorney, Agent, or Firm* — Dentons Durham Jones Pinegar; Sarah W. Matthews

(57) ABSTRACT

A damping device to isolate electronic equipment from its surrounding environment may including a housing comprised of a lower housing and an upper housing, a base pad attached to a bottom side of the lower housing, a suspension material in connection with to a top side of the lower housing, an absorptive material in connection with the suspension material, the upper housing surrounding the absorptive material, and a top pad attached to a top side of the absorptive material. The diameter of the suspension material may be smaller than the diameter of the absorptive material, which may be smaller than the diameter of the upper housing, forming spaces to isolate the absorptive material within the housing.

20 Claims, 6 Drawing Sheets

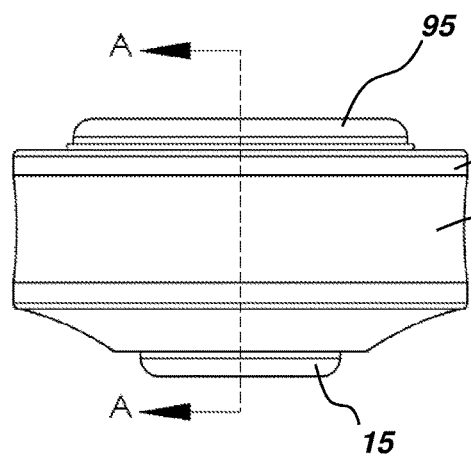
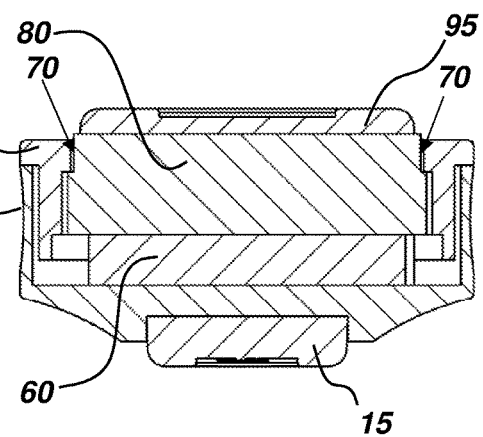
FIG. 3  FIG. 4
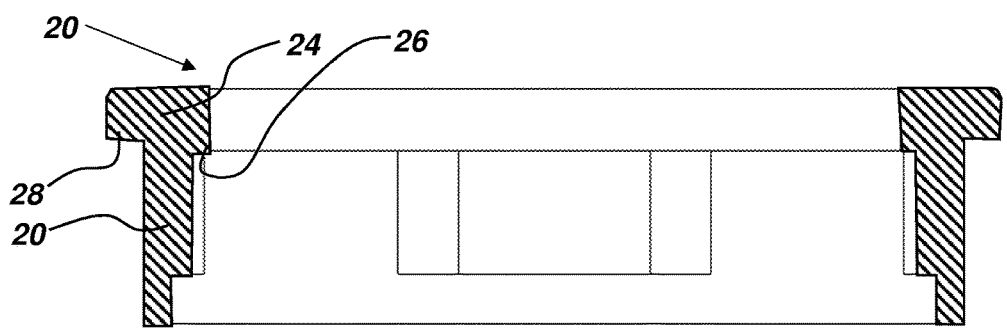
FIG. 5

VIBRATION DAMPER

CROSS-REFERENCE

Claim for priority to the Jan. 8, 2020 filing date of U.S. Provisional Patent Application No. 62/958,553, titled VIBRATION DAMPER ("the '553 Provisional Application") is hereby made. The entire disclosure of the '553 Provisional Application is hereby incorporated herein.

TECHNICAL FIELD

This disclosure relates generally to a system and method for decoupling vibrations or suppressing vibrations in systems. More specifically, the disclosure relates to a system and method for decoupling vibrations utilizing a dampening material "floating" within a housing.

BACKGROUND

Unwanted vibrations in audio and optical equipment can lead to degradation in the performance of the devices. For example, undamped vibration, movement, or shocks, can lead to degradation in the quality of the signal output from audio equipment such as speakers, amplifiers, microphones, audio mixers and related equipment. Audio equipment such as speakers typically rest on a surface, such as a shelf, floor, or other horizontal surface. Vibrations either coming into or out of the audio equipment into the surrounding surfaces typically degrade the quality of the signal from the audio equipment. Dampers between audio equipment and the surface the audio equipment rests on may reduce unwanted vibration. For example, dampers may be placed under electronic equipment to control vibrations moving into or out of the electronic equipment.

SUMMARY

A system for damping vibrations may comprise: a housing comprised of a lower housing and an upper housing; a base pad attached to a bottom side of the lower housing; a suspension material in connection with to a top side of the lower housing; an absorptive material in connection with the suspension material; the upper housing surrounding the absorptive material; and/or a top pad attached to a top side of the absorptive material.

In some configurations, the base pad may comprise a first viscoelastic material, and the top pad comprises a second viscoelastic material. In some configurations, the first and second viscoelastic materials may be the same viscoelastic material. In other configurations, the second viscoelastic material may be softer than the first viscoelastic material.

According to another aspect, the suspension material may have a smaller diameter than the absorptive material. The absorptive material may have a diameter smaller than a diameter of the upper housing. The system may comprise a first space formed between the upper housing and the lower housing, and/or a second space between the upper housing and the absorptive material.

According to another aspect, a system for damping vibrations may comprise: a housing comprised of a lower, outer housing and an upper, inner housing, the upper, inner housing comprising an inwardly extending shoulder and an outwardly extending shoulder at a top side of the upper, inner housing, a portion of the outwardly extending shoulder interfacing with the lower, outer housing, forming a first space between the upper, inner housing and the lower, outer housing; a base pad connected to a bottom side of the lower, outer housing; a suspension material abutting a top side of the lower, outer housing; an absorptive material abutting the suspension material, the absorptive material comprising a lower portion and an upper portion, the upper portion having a smaller diameter than the lower portion, forming an absorptive material shoulder between the lower portion and the upper portion, the absorptive material shoulder abutting the inwardly extending shoulder of the upper, inner housing, forming a second space between the upper portion of the absorptive material and the upper, inner housing and a third space between the lower portion of the absorptive material and the upper, inner housing; and wherein the suspension material has a diameter smaller than the lower portion of the absorptive material, forming a fourth space between the suspension material and the upper, inner housing.

The system may further comprise a viscoelastic pad attached to a top side of the absorptive material. The base pad may comprise a viscoelastic material, and the viscoelastic pad may be softer than the viscoelastic material of the base pad. In some configurations the system may comprise a metal disc for receiving a spiked foot attached to a top side of the absorptive material.

According to another aspect, a system for damping vibrations may comprise: a housing comprised of a lower, outer housing and an upper, inner housing, the upper, inner housing comprising an outwardly extending projection at a top side of the upper, inner housing, a portion of the outwardly extending projection interfacing with the lower, outer housing, forming a first space between the upper, inner housing and the lower, outer housing; a base pad connected to a bottom side of the lower, outer housing; a suspension material abutting a top side of the lower, outer housing; an absorptive material abutting the suspension material, the absorptive material having a diameter smaller than a diameter of the upper, inner housing, forming a second space between the absorptive material and the upper, inner housing; and wherein the suspension material has a diameter smaller than the diameter of the absorptive material, forming a third space between the suspension material and the upper, inner housing.

According to yet another aspect, a method for damping vibrations is described, the method comprising: isolating an absorptive material within a housing.

The method may further comprise the step of placing the absorptive material within a housing, the housing comprised of: a lower, outer housing and an upper, inner housing, the upper, inner housing comprising an outwardly extending projection at a top side of the upper, inner housing, a portion of the outwardly extending projection interfacing with the lower, outer housing, forming a first space between the upper, inner housing and the lower, outer housing; a base pad connected to a bottom side of the lower, outer housing; a suspension material abutting a top side of the lower, outer housing; and the absorptive material abutting the suspension material, the absorptive material having a diameter smaller than a diameter of the upper, inner housing, forming a second space between the absorptive material and the upper, inner housing. In some configurations, the suspension material may have a smaller diameter than the diameter of the absorptive material, forming a third space between the suspension material and the upper, inner housing.

There is a plurality of means and methods for configurations of the vibration damper and multiple variations are disclosed herein. Other aspects, as well as features and advantages of various aspects of the disclosed subject matter will become apparent to one of ordinary skill in the art form the ensuing description, the accompanying drawings and the appended claims.

BRIEF DESCRIPTION OF THE DRAWINGS

In the drawings:

FIG. 3 is a front, plan view of the vibration damper of FIG. 1;

FIG. 4 is a cross-sectional front, plan view of the vibration damper of FIG. 1 taken along line A-A of FIG. 3;

FIG. 5 is a cross-sectional front, plan view of the upper housing of the vibration damper of FIG. 1;

DETAILED DESCRIPTION

FIGS. 1-7 illustrate an exemplary vibration damper. As used herein, the "top side" refers to the side of the damper device, or side of a portion of the damper device, that is closer to an audio device mounted on the damper; and "bottom side" refers to the side of the damper, or side of a portion of the damper, that is closer to a surface the damper may rest on.

Figure 1:
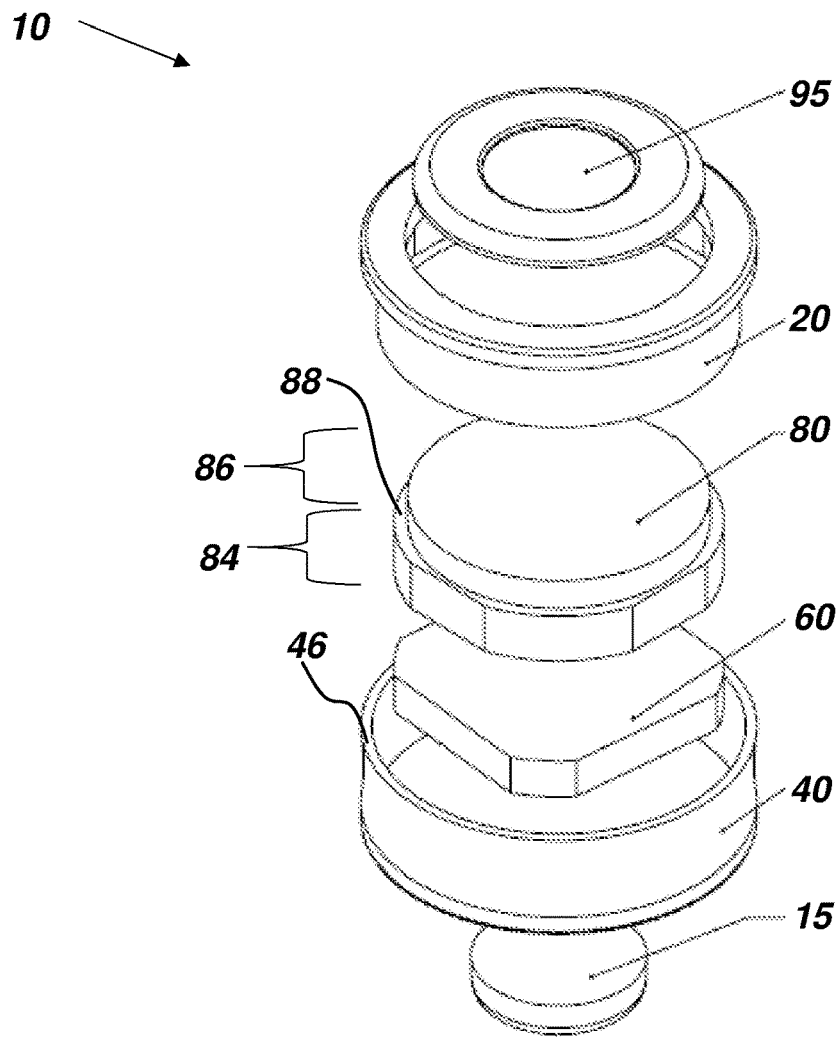
FIG. 1 is an exploded perspective view of a configuration of a vibration damper.
Figure 2:
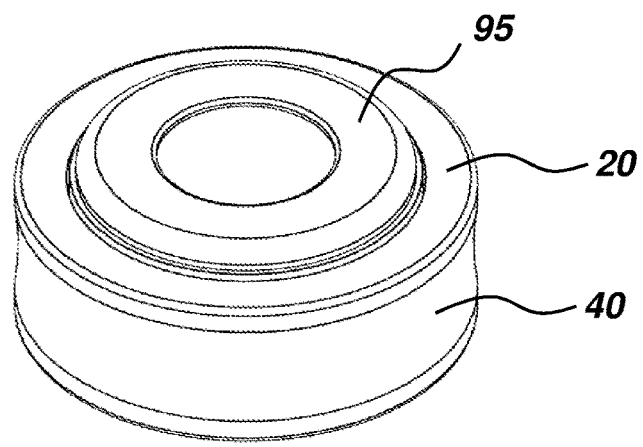
FIG. 2 is a perspective view of the vibration damper of FIG. 1.

As seen in the exploded view of FIG. 1, the device generally comprises a housing (for example, the housing might comprise two portions, such as an upper, inner housing 20 and a lower, outer housing 40), with a suspension material 60 and an absorptive material 80 enclosed within the housing. A base pad 15 may be provided and attached to the bottom side 42 of the lower, outer housing 40. The base pad 15 may rest on a surface for holding audio equipment. For example, the base pad 15 may be adapted to rest on a flat surface or substantially flat surface. A top pad 95 may also be provided for resting the audio equipment or other equipment with damping needs on top of the damping device 10.

As seen in FIGS. 1-7, the housing may be formed of an upper, inner housing 20 and a lower, outer housing 40. In other configurations, the housing may be formed from one integral piece, or three or more pieces. The inner and outer housings could also be interchangeable such that the upper housing could be configured as the upper, outer housing and the lower housing could be configured as the lower, inner housing. The housing (whether formed of one, two, or three or more portions), may be constructed from any suitable material, for example, stainless steel, other metals, etc., may be used. In some configurations, a non-isolating material or non-dampening material may be used to form the housing.

As discussed in more detail below, the outer housing(s) may be separated from the internal vibration absorbent material and elastomeric suspension material, such that the internal damping materials "float" relative to the outer housing(s). In this manner, vibrations that affect the outer housing(s) such as physical touch, vibrations, or acoustical energies, do not impact the inner damping system.

Figure 6:
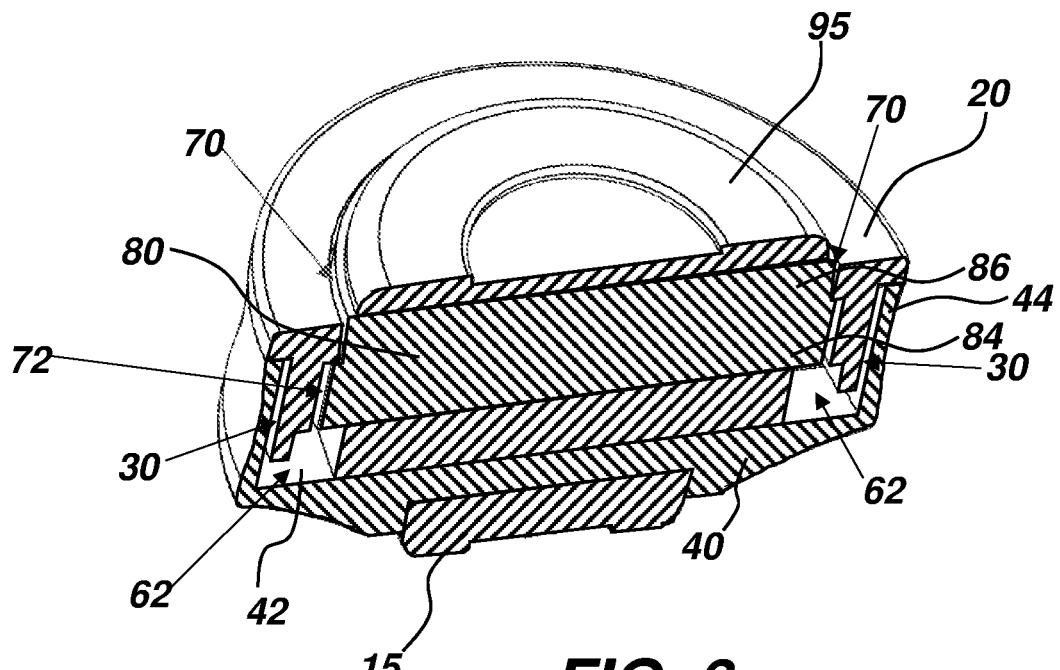
FIG. 6 is an upper, perspective cross-sectional view of the vibration damper of FIG. 1.
Figure 7:
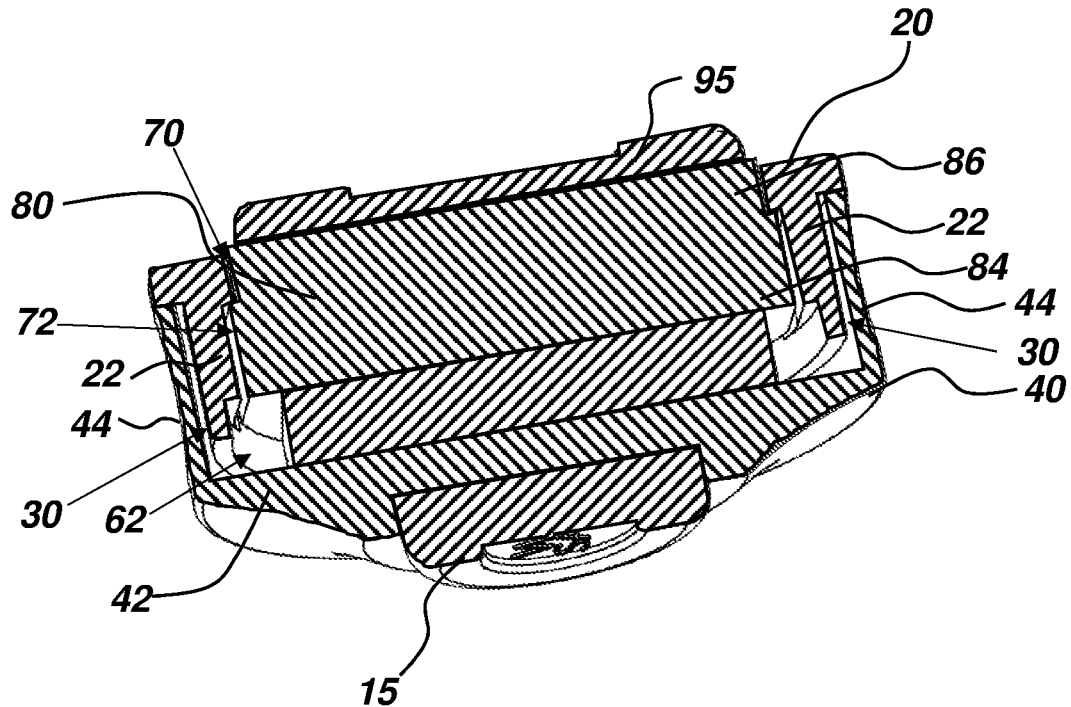
FIG. 7 is a lower, perspective cross-sectional view of the vibration damper of FIG. 1.

In the configuration shown in FIG. 1, the lower, outer housing 40 may be generally shaped as a hollow cylindrical cap, with a bottom portion 42 and a vertically extending portion 44 surrounding the outer perimeter of bottom portion, creating a void for receiving the suspension material 60 and absorptive material 80. The upper, inner housing 20 may comprise a vertical portion 22 and a horizontal portion 24 located at the top of the upper, inner housing 20 (FIG. 5). The horizontal portion may comprise an inwardly extending projection 26 and an outwardly extending projection 28 (FIG. 5). A portion of the outwardly extending projection 28 may abut the top side 46 of the vertically extending portion 44 of the lower, outer housing 40, forming a first space or void 30 between the vertical portion 22 of the upper, inner housing 20 and the lower, outer housing 40 (FIGS. 6-7). This first space 30 may aid in damping, as described in more detail below. In some configurations, there may be a space between the entire perimeter of the absorptive material 80 and the housing such that the absorptive material 80 does not come into direct contact with the housing. In other configurations, there may be no space between the sides of the upper, inner housing 20 and the lower, outer housing 40, such that the absorptive material 80 abuts the housing. In yet other configurations, the absorptive material 80 may abut the upper, inner housing 20 but may not directly touch or contact the lower, outer housing 40.

A suspension material 60 may abut or otherwise be connected to a top side of the bottom portion 42 of the lower, outer housing 40. The suspension material 60 may be connected, for example, by abutting or being pressed against the bottom portion 42 of the lower, outer housing 40. In some configurations, a recess may be provided in the bottom portion 42 of the lower, outer housing 40 to receive a portion of the suspension material 60. The suspension material 60 may also be permanently or selectively connected to the bottom portion 42 of the lower, outer housing 40 via any suitable means, such as an adhesive.

The suspension material 60 may have a diameter, and the diameter may be smaller than the diameter of the lower, outer housing 40. This may form a space 62 between the outer edge of the suspension material 60 and the inner edge of the lower, outer housing 40. The suspension material 60 may also have a diameter smaller than the diameter of the upper, inner housing 20. In such configurations, the space 62 may also be between the outer edge of the suspension material 60 and the inner edge of the upper, inner housing 20. In some configurations, the suspension material 60 may also have a diameter smaller than a diameter of the absorptive material 80. The suspension material 60 may be formed of any suitable material, such as an elastomeric material. Different types of elastomeric materials with various properties, such as different densities, may be selected to achieve the desired suspension effect.

An absorptive material 80 may be located on top of the suspension material 60. The absorptive material 80 may comprise, for example, any type of material capable of absorbing sound waves. In some configurations the absorptive material 80 may comprise a proprietary composite material, such as Wilson Audio V material. According to one aspect, different models or configurations of the damper device may be provided with various densities of absorptive material, each different density of absorptive material to achieve a specific desired suspension effect. The absorptive material 80 may be placed above the suspension material 60 and within the housing such that it is not mechanically attached to the surrounding housing, or does not touch the housing. This decoupling of the absorptive material 80 from the surrounding structure may aid in vibration damping. As the absorptive material 80 "floats" inside the housing, it may absorb vibrations and not pass them to the surrounding housing. One or more spaces, such as spaces between the absorptive material 80, the upper, inner housing 20, the lower, outer housing 40, and/or the suspension material 60, may serve to isolate the absorptive material 80 within the housing, and thus isolate the equipment resting on the absorptive material 80. Vibrations absorbed by the absorptive material 80 may be converted, for example, to heat.

The absorptive material 80 may be further deformed in use and separated from the housing. For example, in use, as a piece of audio equipment or other equipment with damping needs is placed on top of the absorptive material 80, the absorptive material 80 may deform slightly and not touch the upper housing as a result. In other configurations, the absorptive material 80 may not be deformed or compressed in use, but the suspension material 60 may be compressed and allow the absorptive material 80 to not touch the housing.

In some configurations, the absorptive material 80 may have a specific shape depending on the needs of the device. For example, as seen in FIG. 1, the absorptive material 80 may comprise a lower portion 84 and an upper portion 86, with the lower portion 84 having a larger diameter than the upper portion 86. This may form an absorptive material shoulder 88 or ledge between the lower portion 84 and upper portion 86. The absorptive material shoulder 88 may at least partially abut the inwardly extending projection 26 of the upper, inner housing 20. This may form a second space 70 between the upper portion 86 of the absorptive material 80 and the upper, inner housing 20, and may also form a third space 72 between the lower portion 84 of the absorptive material 80 and the upper, inner housing 20 (FIGS. 6-7). These spaces may aid in vibration damping as they may improve isolation of the absorptive material 80 within the housing. In other configurations, a space between the absorptive material 80 and the upper, inner housing 20 may not be provided. The absorptive material 80 may also be formed of other shapes and sizes.

In some configurations, a pad or metal disc may be placed on top of the absorptive material 80. For example, as seen in FIGS. 1-7, a top pad 95 such as a viscoelastic pad may be placed on top of the absorptive material 80. The top pad 95 may be formed of any suitable material, for example, a viscoelastic material. In some configurations, the top pad 95 may be formed of viscoelastic material that is softer than a viscoelastic material used to form the base pad 15. The top pad 95 may serve to absorb vibrations coming from the equipment being isolated or as the last layer of absorption from vibrations coming from the environment the equipment is mounted to or resting on. In other configurations, the top pad 95 may comprise a metal disc having a recess therein to receive a spiked foot.

Turning now to FIGS. 8-13, there is shown another configuration of a vibration damping device. The device 10' may generally comprise an upper, inner housing 20' and a lower, outer housing 40', with a suspension material 60' and an absorptive material 80' enclosed within the housing. A base pad 15' may be provided and attached to the bottom side of the bottom portion 42' of the lower, outer housing 40'. A metal disc 96 may also be provided for resting the audio equipment or other equipment with damping needs on top of the damping device 10'. Many of the features of this configuration may be similar to the configuration shown in FIGS. 1-7, and like parts are numbered similarly in FIGS. 8-13.

Figure 8:
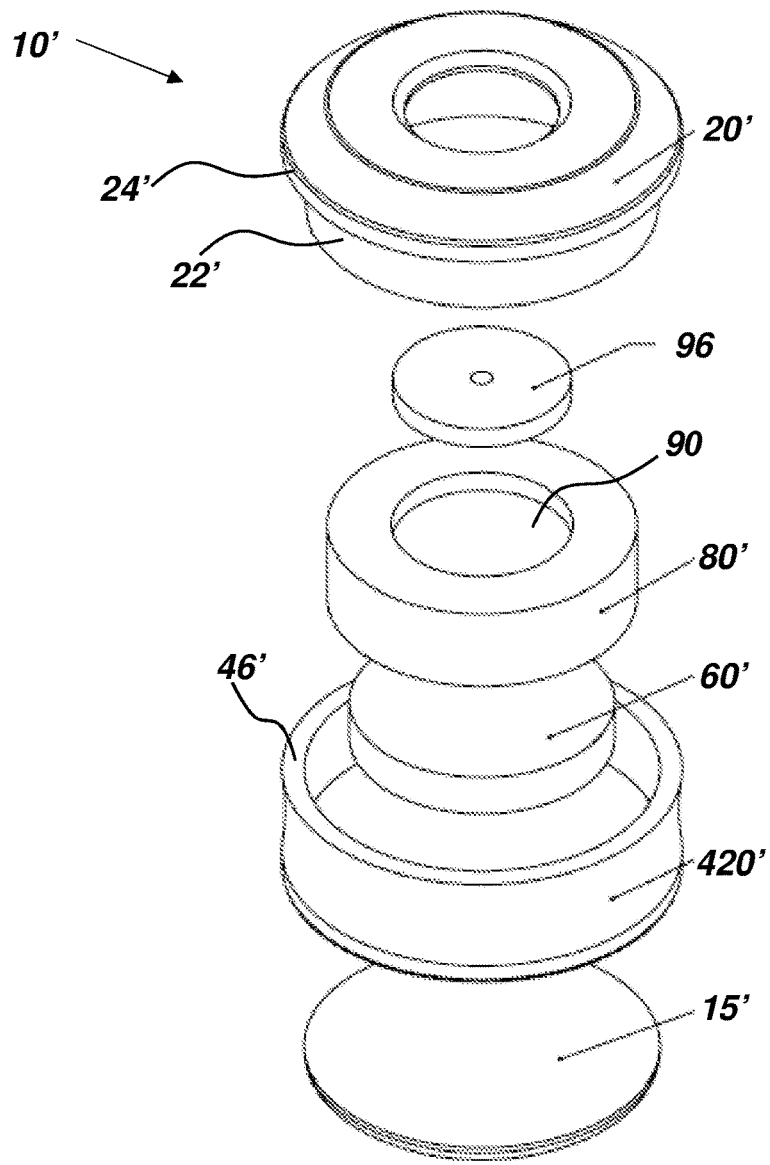
FIG. 8 is an exploded perspective view of another configuration of a vibration damper.
Figure 9:
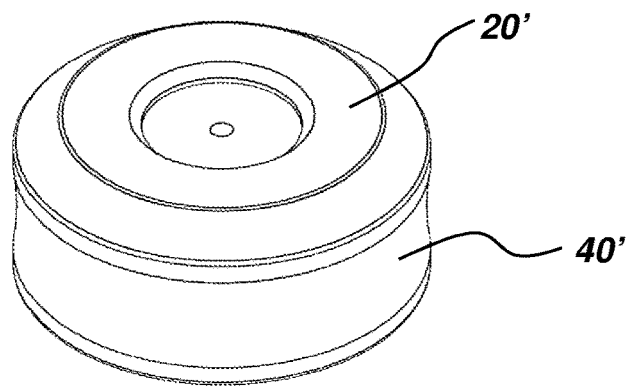
FIG. 9 is a perspective view of the vibration damper of FIG. 8.
Figure 10:
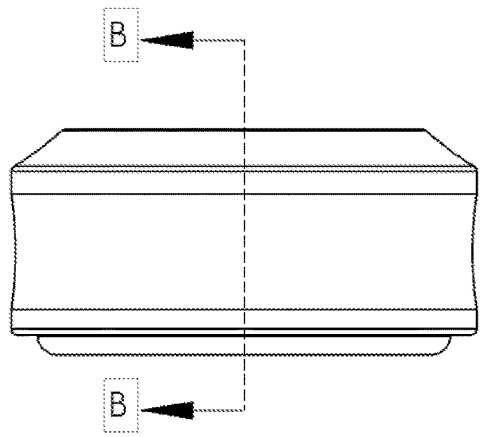
FIG. 10 is a front, plan view of the vibration damper of FIG. 8.
Figure 11:
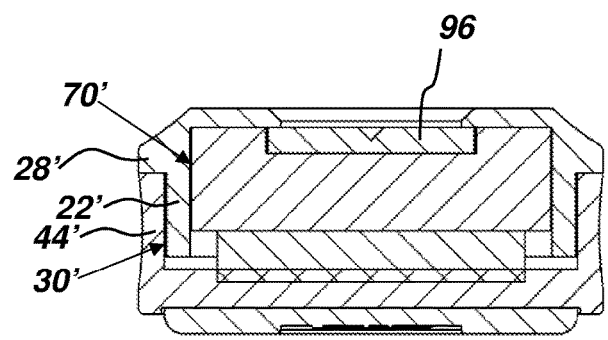
FIG. 11 is a cross-sectional front, plan view of the vibration damper of FIG. 8 taken along line B-B of FIG. 10.
Figure 12:
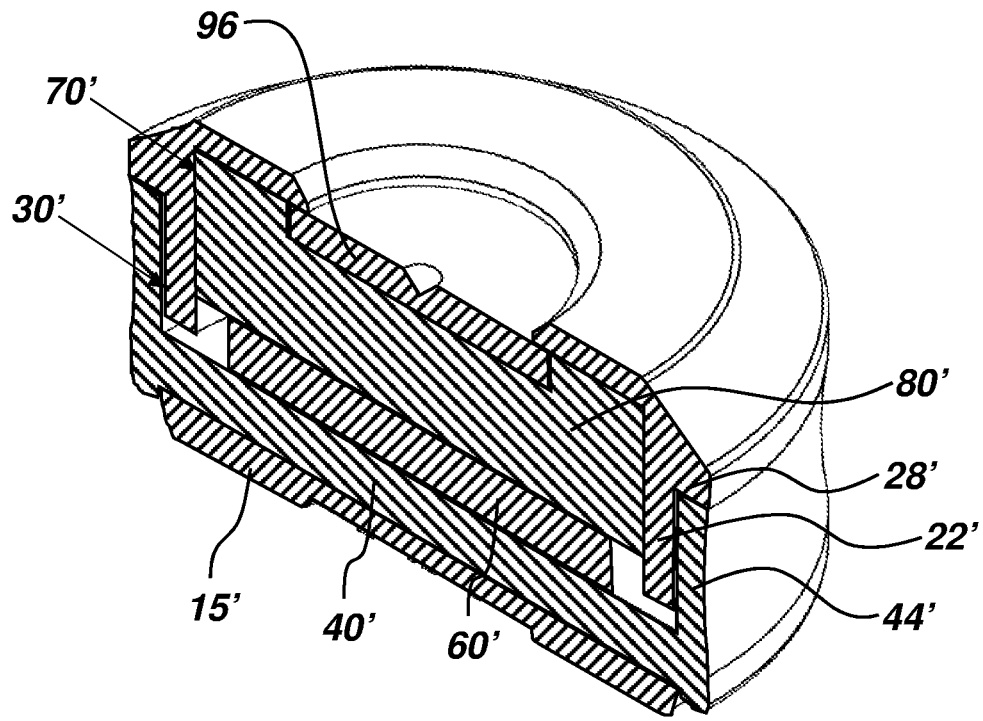
FIG. 12 is an upper, perspective cross-sectional view of the vibration damper of FIG. 8.
Figure 13:
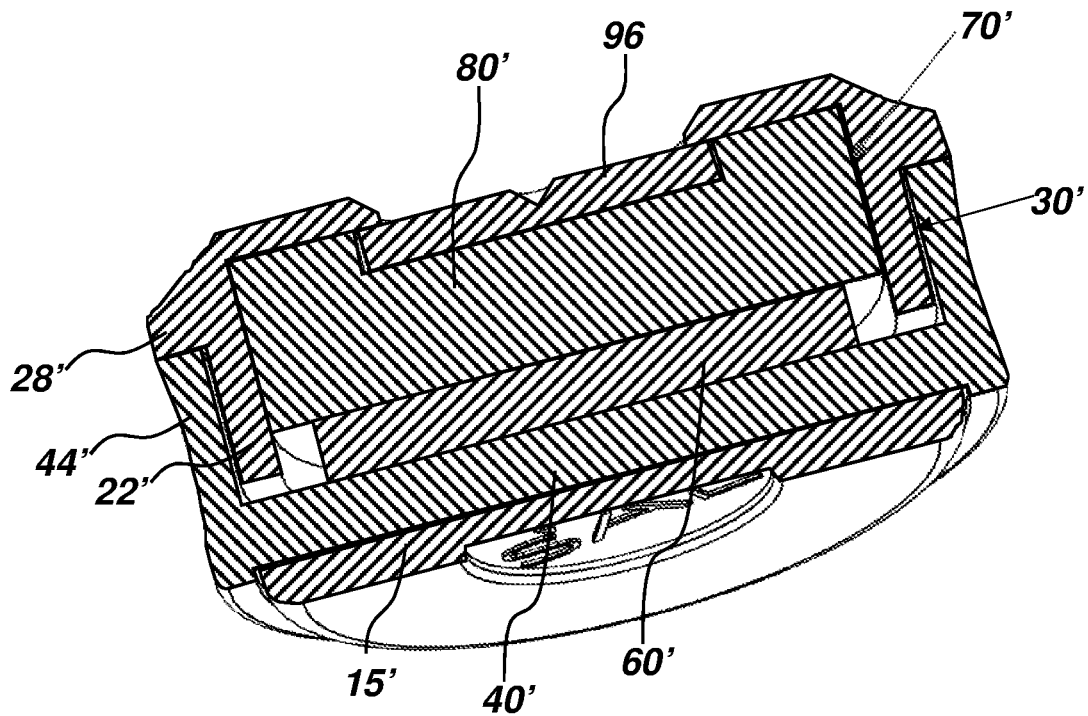
FIG. 13 is a lower, perspective cross-sectional view of the vibration damper of FIG. 8.

The upper, inner housing 20' may comprise a vertical portion 22' and an outwardly extending projection 28' located at the top of the upper, inner housing 20 (FIG. 8. A portion of the outwardly extending projection 28' may abut the top side 46' of the vertically extending portion 44' of the lower, outer housing 40', forming a space or void 30' between the vertical portion 22' of the upper, inner housing 20 and the lower, outer housing 40' (FIG. 11). This space 30' may aid in damping. In other configurations, the lower, outer housing 40' may abut or interface with the upper, inner housing 20' there may be no space between the sides of the upper, inner housing 20 and the lower, outer housing 40. In still yet other configurations, the space 30' may be filled with a damping material.

The absorptive material 80' may have any shape desired, and in the configuration seen in FIGS. 8-13, the absorptive material 80' has a cylindrical shape with a recess 90 formed therein. The recess 90 may be sized to receive a disc, such as a metal disc 96. Metal disc 96 may be shaped to receive the metal foot of any equipment that is in need of vibration damping, such as a metal foot of an audio speaker system. The absorptive material 80' may have a diameter slightly smaller than the diameter of the upper, inner housing 20' such that a space 70' may be formed between the absorptive material 80' and the upper, inner housing 20'. In other configurations, a larger or smaller space may be provided. In additional alternate configurations, material may be placed within the space 70', or the absorptive material 80' may interface with the upper, inner housing 20' such that there is no space between the absorptive material 80' and the upper, inner housing 20'.

In use, a user may first select one or more vibration damping devices. For example, for an audio speaker system having four metal feet, a user may select four damping devices such as those shown in FIGS. 8-13, having metal discs 96 at the top for receiving the metal feet of the audio speaker system. Or for audio equipment having rubber feet, a user may select damping devices such as those shown in FIGS. 1-7. After selecting the appropriate type of damping device and number, the user may then place the audio equipment with the feet on the top surface of the damping device (either on the metal disc 96 or the pad 95). It will be appreciated that not all feet of the audio equipment need be mounted on a damping device. For example, for audio speaker system having four metal feet, one, two, three, or four damping devices may be used to achieve the desired damping effects.

Although the foregoing disclosure provides many specifics, such as use of the system with audio equipment, it will be appreciated that other devices needing vibration damping are contemplated and these should not be construed as limiting the scope of any of the ensuing claims. For example, the vibration damper may be used with optical based and other types of equipment such as telescopes, microscopes, disk players (and similar devices), computer disk drives, photographic equipment, etc. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A system for damping vibrations comprising:
   a housing comprised of a lower housing and an upper housing;
   a base pad attached to a bottom side of the lower housing;
   an elastomeric material in connection with a top side of the lower housing;
   an absorptive material in connection with the elastomeric material, the elastomeric material supporting the absorptive material;
   the upper housing surrounding the absorptive material; and
   a top pad attached to a top side of the absorptive material, the top pad for engaging a piece of equipment that is sensitive to vibrations, the absorptive material deformable under an applied weight of the piece of equipment that is sensitive to vibrations.

2. The system of claim 1, wherein the lower housing and the upper housing are formed of a non-isolating material, and wherein the absorptive material and the top pad move in parallel in a direction of the applied weight.

3. The system of claim 2, wherein the base pad comprises a first viscoelastic material and the top pad comprises a second viscoelastic material.

4. The system of claim 3, wherein the first and second viscoelastic materials are the same viscoelastic material.

5. The system of claim 3, wherein the second viscoelastic material is softer than the first viscoelastic material.

6. The system of claim 1, wherein the elastomeric material has a first diameter and the absorptive material has a second diameter, and wherein the first diameter is smaller than the second diameter.

7. The system of claim 6, wherein the upper housing has a third diameter and wherein the second diameter is smaller than the third diameter.

8. The system of claim 7, comprising a first space formed between the upper housing and the lower housing, and a second space between the upper housing and the absorptive material.

9. The system of claim 7, comprising a space between the elastomeric material and the lower housing.

10. The system of claim 9, wherein the absorptive material and the lower housing are not in direct contact.

11. The system of claim 1, wherein the lower housing and upper housing are formed integrally.

12. A system for damping vibrations comprising:
    a housing comprised of a lower, outer housing and an upper, inner housing, the upper, inner housing comprising an inwardly extending shoulder and an outwardly extending shoulder at a top side of the upper, inner housing, a portion of the outwardly extending shoulder interfacing with the lower, outer housing, forming a first space between the upper, inner housing and the lower, outer housing;
    a base pad connected to a bottom side of the lower, outer housing, the base pad for resting on a flat surface;
    a suspension material abutting a top side of the lower, outer housing;
    an absorptive material abutting the suspension material, the absorptive material for supporting a weight of a piece of equipment that is sensitive to vibrations, the absorptive material deformable under an applied weight of the piece of equipment that is sensitive to vibrations and the absorptive material comprising a lower portion and an upper portion, the upper portion having a smaller diameter than the lower portion, forming an absorptive material shoulder between the lower portion and the upper portion, the absorptive material shoulder laterally abutting the inwardly extending shoulder of the upper, inner housing, forming a second space between the upper portion of the absorptive material and the upper, inner housing and a third space between the lower portion of the absorptive material and the upper, inner housing; and
    wherein the suspension material has a diameter smaller than the lower portion of the absorptive material, forming a fourth space between the suspension material and the upper, inner housing.

13. The system claim 12, further comprising a viscoelastic pad attached to a top side of the absorptive material.

14. The system of claim 13, wherein the base pad comprises a viscoelastic material, and wherein the viscoelastic pad is softer than the viscoelastic material of the base pad.

15. The system of claim 12, further comprising a metal disc attached to a top side of the absorptive material, the metal disc for receiving a spiked foot of a piece of equipment that is sensitive to vibrations.

16. The system of claim 12, wherein the lower housing and the upper housing are formed of a non-isolating material.

17. The system of claim 12, wherein the lower housing and the upper housing are formed integrally.

18. A method for damping vibrations, the method comprising:
    isolating an absorptive material within a housing, the housing including:
      a lower, outer housing and an upper, inner housing formed of non-dampening material, the upper, inner housing comprising an outwardly extending projection at a top side of the upper, inner housing, a portion of the outwardly extending projection interfacing with the lower, outer housing, forming a first space between the upper, inner housing and the lower, outer housing;
      a base pad connected to a bottom side of the lower, outer housing, the base pad for resting on a flat surface;
      a suspension material abutting a top side of the lower, outer housing; and
      the absorptive material abutting the suspension material, the absorptive material having a diameter smaller than a diameter of the upper, inner housing, forming a second space between the absorptive material and the upper, inner housing;
    applying a force to the absorptive material by placing a piece of equipment that is sensitive to vibrations on top of the absorptive material; and
    the absorptive material deformable under the applied force of the piece of equipment that is sensitive to vibrations.

19. The method of claim 18, wherein the suspension material has a smaller diameter than the diameter of the absorptive material, forming a third space between the suspension material and the upper, inner housing.

20. The method of claim 18, wherein the housing further includes a metal disc attached to a top side of the absorptive material, and wherein the method further comprises the step of positioning a spiked foot of a piece of equipment that is sensitive to vibrations in the metal disc.

\* \* \* \* \*